US012107885B1

(12) United States Patent
Kawasaki et al.

(10) Patent No.: US 12,107,885 B1
(45) Date of Patent: Oct. 1, 2024

(54) PROMPT INJECTION CLASSIFIER USING INTERMEDIATE RESULTS

(71) Applicant: HiddenLayer, Inc., Austin, TX (US)

(72) Inventors: Amelia Kawasaki, Corvallis, OR (US); Andrew Davis, Portland, OR (US)

(73) Assignee: HiddenLayer, Inc., Austin, TX (US)

( * ) Notice: Subject to any disclaimer, the term of this patent is extended or adjusted under 35 U.S.C. 154(b) by 0 days.

(21) Appl. No.: 18/648,252

(22) Filed: Apr. 26, 2024

(51) Int. Cl.
*H04L 9/40* (2022.01)
*G06N 20/00* (2019.01)

(52) U.S. Cl.
CPC ......... *H04L 63/1466* (2013.01); *G06N 20/00* (2019.01); *H04L 63/1416* (2013.01)

(58) Field of Classification Search
None
See application file for complete search history.

(56) References Cited

U.S. PATENT DOCUMENTS

| | | | |
|---|---|---|---|
| 7,802,298 B1 | 9/2010 | Hong et al. | |
| 9,356,941 B1 | 5/2016 | Kislyuk et al. | |
| 10,193,902 B1 | 1/2019 | Caspi et al. | |
| 10,210,036 B2 | 2/2019 | Iyer et al. | |
| 10,462,168 B2 | 10/2019 | Shibahara et al. | |
| 10,637,884 B2 * | 4/2020 | Apple | H04L 63/1416 |
| 10,764,313 B1 | 9/2020 | Mushtaq | |
| 10,803,188 B1 | 10/2020 | Rajput et al. | |
| 11,310,270 B1 | 4/2022 | Weber et al. | |
| 11,483,327 B2 | 10/2022 | Hen et al. | |
| 11,501,101 B1 | 11/2022 | Ganesan et al. | |
| 11,551,137 B1 | 1/2023 | Echauz et al. | |
| 11,601,468 B2 | 3/2023 | Angel et al. | |
| 11,710,067 B2 | 7/2023 | Harris et al. | |
| 11,762,998 B2 | 9/2023 | Kuta et al. | |
| 11,777,957 B2 | 10/2023 | Chen et al. | |
| 11,875,130 B1 | 1/2024 | Bosnjakovic et al. | |
| 11,893,111 B2 | 2/2024 | Sai et al. | |
| 11,893,358 B1 | 2/2024 | Lakshmikanthan et al. | |
| 11,960,514 B1 | 4/2024 | Taylert et al. | |
| 11,962,546 B1 * | 4/2024 | Hattangady | G06F 40/56 |
| 11,971,914 B1 | 4/2024 | Watson et al. | |
| 11,972,333 B1 | 4/2024 | Horesh et al. | |
| 11,997,059 B1 | 5/2024 | Su et al. | |
| 2014/0033307 A1 | 1/2014 | Schmidtler | |

(Continued)

OTHER PUBLICATIONS

Chao et al., 2023, "Jailbreaking black box large language models in twenty queries," University of Pennsylvania, Available online at: https://arxiv.org/abs/2211.09527 (21 pages).

(Continued)

*Primary Examiner* — Joseph P Hirl
*Assistant Examiner* — Hassan Saadoun
(74) *Attorney, Agent, or Firm* — Jones Day

(57) ABSTRACT

An analysis engine receives data characterizing a prompt for ingestion by a generative artificial intelligence (GenAI) model. An intermediate result of the GenAI model or a proxy of the GenAI model responsive to the prompt is obtained. The analysis engine, using a prompt injection classifier and the intermediate result, determines whether the prompt comprises or is indicative of malicious content or elicits malicious actions. Data characterizing the determination is provided to a consuming application or process. Related apparatus, systems, techniques and articles are also described.

30 Claims, 14 Drawing Sheets

(56) References Cited

U.S. PATENT DOCUMENTS

| | | | | |
|---|---|---|---|---|
| 2014/0157415 | A1 | 6/2014 | Abercrombie et al. | |
| 2016/0344770 | A1 | 11/2016 | Verma et al. | |
| 2017/0251006 | A1 | 8/2017 | LaRosa et al. | |
| 2017/0331841 | A1 | 11/2017 | Hu et al. | |
| 2018/0063190 | A1 | 3/2018 | Wright et al. | |
| 2018/0205734 | A1 | 7/2018 | Wing et al. | |
| 2018/0219888 | A1 | 8/2018 | Apostolopoulos | |
| 2018/0324193 | A1 | 11/2018 | Ronen et al. | |
| 2019/0050564 | A1 | 2/2019 | Pogorelik et al. | |
| 2019/0260784 | A1 | 8/2019 | Stockdale et al. | |
| 2019/0311118 | A1 | 10/2019 | Grafi et al. | |
| 2020/0019721 | A1 | 1/2020 | Shanmugam et al. | |
| 2020/0076771 | A1 | 3/2020 | Maier et al. | |
| 2020/0219009 | A1 | 7/2020 | Dao et al. | |
| 2020/0233979 | A1 | 7/2020 | Maraghoosh et al. | |
| 2020/0285737 | A1 | 9/2020 | Kraus et al. | |
| 2020/0409323 | A1 | 12/2020 | Spalt et al. | |
| 2021/0209464 | A1 | 7/2021 | Bala et al. | |
| 2021/0224425 | A1 | 7/2021 | Nasr-Azadani et al. | |
| 2021/0319098 | A1* | 10/2021 | Pogorelik | G06N 5/04 |
| 2021/0319784 | A1 | 10/2021 | Le Roux et al. | |
| 2021/0357508 | A1 | 11/2021 | Elovici et al. | |
| 2021/0374247 | A1 | 12/2021 | Sultana et al. | |
| 2021/0407051 | A1 | 12/2021 | Pardeshi et al. | |
| 2022/0030009 | A1 | 1/2022 | Hasan | |
| 2022/0058444 | A1 | 2/2022 | Olabiyi et al. | |
| 2022/0070195 | A1 | 3/2022 | Sern et al. | |
| 2022/0114399 | A1 | 4/2022 | Castiglione et al. | |
| 2022/0147597 | A1 | 5/2022 | Bhide et al. | |
| 2022/0164444 | A1 | 5/2022 | Prudkovskij et al. | |
| 2022/0166795 | A1 | 5/2022 | Simioni et al. | |
| 2022/0182410 | A1 | 6/2022 | Tupsamudre et al. | |
| 2022/0269796 | A1 | 8/2022 | Chase et al. | |
| 2022/0309179 | A1 | 9/2022 | Payne et al. | |
| 2023/0008037 | A1 | 1/2023 | Venugopal et al. | |
| 2023/0027149 | A1 | 1/2023 | Kuan et al. | |
| 2023/0049479 | A1 | 2/2023 | Mozo Velasco et al. | |
| 2023/0109426 | A1 | 4/2023 | Hashimoto et al. | |
| 2023/0148116 | A1 | 5/2023 | Stokes et al. | |
| 2023/0169397 | A1 | 6/2023 | Smith et al. | |
| 2023/0185912 | A1 | 6/2023 | Sinn et al. | |
| 2023/0185915 | A1 | 6/2023 | Rao et al. | |
| 2023/0208869 | A1* | 6/2023 | Bisht | G06N 7/01 726/23 |
| 2023/0229960 | A1* | 7/2023 | Zhu | G10L 15/063 706/12 |
| 2023/0259787 | A1 | 8/2023 | David et al. | |
| 2023/0269263 | A1 | 8/2023 | Yarabolu | |
| 2023/0274003 | A1 | 8/2023 | Liu et al. | |
| 2023/0289604 | A1 | 9/2023 | Chan et al. | |
| 2023/0351143 | A1 | 11/2023 | Kutt et al. | |
| 2023/0359903 | A1* | 11/2023 | Cefalu | G06F 40/279 |
| 2023/0385085 | A1* | 11/2023 | Singh | G06N 7/01 |
| 2023/0388324 | A1 | 11/2023 | Thompson | |
| 2024/0022585 | A1 | 1/2024 | Burns et al. | |
| 2024/0039948 | A1 | 2/2024 | Koc et al. | |
| 2024/0045959 | A1 | 2/2024 | Marson et al. | |
| 2024/0078337 | A1* | 3/2024 | Kamyshenko | G06F 21/6245 |
| 2024/0080333 | A1 | 3/2024 | Burns et al. | |
| 2024/0126611 | A1 | 4/2024 | Phanishayee et al. | |
| 2024/0160902 | A1 | 5/2024 | Padgett et al. | |

OTHER PUBLICATIONS

Goodfellow et al., 2015, "Explaining and harnessing adversarial examples," 3rd International Conference on Learning Representations, ICLR 2015, Available online at: http://arxiv.org/abs/1412.6572 (11 pages).

Hu et al., 2022, "LoRA: Low-rank adaptation of large language models," International Conference on Learning Representations, Available online at: https://openreview.net/forum?id=nZeVKeeFYf9 (13 pages).

Imoxto, 2024, "prompt injection cleaned dataset-v2," Hugging Face, available online at: https://huggingface.co/datasets/imoxto/prompt_injection_cleaned_datasetv2 (3 pages).

Jiang et al., 2023, "Mistral 7b," Available online at: https://mistral.ai/news/announcing-mistral-7b (9 pages).

Ke et al., 2017, "Lightgbm: a highly efficient gradient boosting decision tree," Proceedings of the 31st International Conference on Neural Information Processing Systems (9 pages).

Lee et al., 2023, "Wizardvicunalm," Available online at: https://github.com/melodysdreamj/WizardVicunaLM (6 pages).

Lee, 2023, "ChatGPT DAN," ChatGPT DAN, Jailbreaks prompt, Available online at: https://github.com/0xk1h0/ChatGPT DAN (3 pages).

Lian et al., 2023. "Openorca: An open dataset of gpt augmented flan reasoning traces," Hugging Face, Available online at: https://huggingface.co/Open-Orca/OpenOrca (8 pages).

Luo et al., 2024, "Jailbreakv-28k: A benchmark for assessing the robustness of multimodal large language models against jailbreak attacks," Available online at: https://arxiv.org/abs/2404.03027 (20 pages).

MacDiarmid et al., 2024, "Simple probes can catch sleeper agents," Available online at: https://www.anthropic.com/news/probescatch-sleeper-agents (18 pages).

Perez et al., 2022, "Ignore previous prompt: Attack techniques for language models," NeurIPS ML Safety Workshop, 36th Conference on Neural Information Processing System (NeurIPS2022), Available online at: https://openreview.net/forum?id=giaRo 7Zmug (21 pages).

Raman et al., 2023, "Model-tuning via prompts makes NLP models adversarially robust," The 2023 Conference on Empirical Methods in Natural Language Processing, Available online at: https://openreview.net/forum?id=R4yb4m7Nus (21 pages).

Schulhoff et al., 2023, "Ignore this title and hackAPrompt: Exposing systemic vulnerabilities of LLMs through a global prompt hacking competition," The 2023 Conference on Empirical Methods in Natural Language Processing, Available online at: https://openreview.net/forum?id=hcDE6sOEfu (33 pages).

Sujet-Ai, 2024, "Sujet finance dataset," Huging Face, https://huggingface.co/datasets/sujetai/Sujet-Finance-Instruct-177k (6 pages).

Templeton et al., 2024, "Scaling monosemanticity: Extracting interpretable features from claude 3 sonnet," Transformer Circuits Thread, Available online at: https://transformer-circuits.pub/2024/scalingmonosemanticity/index.html (75 pages).

Touvron et al., 2023, "Llama 2: Open foundation and fine-tuned chat models," Available online at: https://arxiv.org/abs/2307.09288 (77 pages).

Zhang et al., 2024, "Tinyllama: An open-source small language model," Available online at: https://arxiv.org/abs/2401.02385 (10 pages).

Zheng et al., 2023, "Judging LLM-as-a-judge with MT-bench and chatbot arena," Thirty-seventh Conference on Neural Information Processing Systems Datasets and Benchmarks Track, Available online at: https://openreview.net/forum?id=uccHPGDlao (29 pages).

Zou et al., 2023, "Representation engineering: A top-down approach to ai transparency," Available online at: https://arxiv.org/abs/2310.01405 (55 pages).

Zou et al., 2023, "Universal and transferable adversarial attacks on aligned language models," Available online at: https://arxiv.org/abs/2307.15043 (31 pages).

Morozov et al., 2019, "Unsupervised Neural Quantization for Compressed-Domain Similarity Search," International Conference on Computer Vision (ICCV) 2019 (11 pages).

* cited by examiner

1200

1300

PROMPT INJECTION CLASSIFIER USING INTERMEDIATE RESULTS

TECHNICAL FIELD

The subject matter described herein relates to techniques for identifying or otherwise characterizing a prompt injection attack on an artificial intelligence (AI) model, such as a large language model, using a prompt injection classifier and an intermediate result of the AI model such as activation functions.

BACKGROUND

Machine learning (ML) algorithms and models, such as large language models, ingest large amounts of data and use pattern recognition and other techniques to make predictions and adjustments based on that data. These models have attack surfaces that can be vulnerable to cyberattacks in which adversaries attempt to manipulate or modify model behavior. These attacks can act to corrupt input data so as to make outputs unreliable or incorrect. By modifying or otherwise manipulating the input of a model, an attacker can modify an output of an application or process for malicious purposes including bypassing security measures resulting in data leakage, unauthorized system access, and the solicitation of unlawful or otherwise restricted information.

SUMMARY

In a first aspect, an analysis engine receives data characterizing a prompt for ingestion by a generative artificial intelligence (GenAI) model. An intermediate result of the GenAI model in response to ingesting the prompt is captured. The analysis engine, using a prompt injection classifier and based on the intermediate result, determines whether the prompt comprises malicious content or elicits malicious actions. Data characterizing the determination is later provided to a consuming application or process.

The GenAI model can comprise a plurality of transformer layers and the intermediate result can comprise activations in residual streams generated by one or more transformer layers.

The GenAI model can be a mixture of experts (MoE) model and, in such cases, the intermediate result can include outputs from at least a subset of experts in the MoE model.

The data characterizing the prompt can be vectorized to result in one or more vectors. In some variations, a dimensionality of the intermediate result can be reduced using a technique such as principal component analysis (PCA). The prompt injection classifier can use this reduced dimensionality representation of the intermediate result when making the determination. In some variations, the prompt injection classifier uses both features corresponding to the reduced dimensionality representation of the intermediate result as well as other features derived from other information.

The GenAI model can take various forms including a large language model.

The consuming application or process can take various actions based on the determination. For example, the consuming application or process can allow the prompt to be input into the GenAI model upon a determination that the prompt does not comprise malicious content and/or it can prevent the prompt from being input into the GenAI model upon a determination that the prompt comprises or elicits malicious content. The consuming application or process can flag (e.g., generate an alert, label, etc.) the prompt as being malicious for quality assurance upon a determination that the prompt comprises or elicits malicious content. The consuming application or process can modify the prompt to be benign upon a determination that the prompt comprises or elicits malicious content and can cause the modified prompt to be ingested by the GenAI model. The consuming application or process can block an internet protocol (IP) address of a requester of the prompt upon a determination that the prompt comprises or elicits malicious content. The consuming application or process can cause subsequent prompts from the IP address of the requester of the prompt to be modified upon a determination that the prompt comprises or elicits malicious content and can cause the modified prompt to be ingested by the GenAI model.

In an interrelated aspect, the prompt injection classifier can be a multi-class model. With such an arrangement, an analysis engine receives data characterizing a prompt for ingestion by a generative artificial intelligence (GenAI) model. An intermediate result of the prompt is captured. The analysis engine uses the prompt injection classifier and the intermediate result to determine a category for the prompt which is indicative of whether the prompt comprises or elicits malicious content. Data characterizing such a determination can be provided to a consuming application or process.

The categories can take varying forms. As one example, the category can specify a threat severity for the prompt (malicious, suspicious, unknown, or benign, etc.). In other variations, the category can specify a type of prompt injection attack. The prompt injection attack types can include, for example, one or more of: a direct task deflection attack, a special case attack, a context continuation attack, a context termination attack, a syntactic transformation attack, an encryption attack, and/or a text redirection attack. In these variations, one or more remediation actions can be initiated which are tailored to the specified type of prompt injection attack (as determined by the prompt injection classifier). In some cases, the prompt injection classifier can comprise a plurality of different machine learning models (e.g., an ensemble of machine learning models) in which at least some of such models are trained to categorize a different type of prompt injection attack.

The consuming application or process can take various actions based on the determined category of the prompt. For example, the consuming application or process can allow the prompt to be input into the GenAI model upon a determination that the prompt is of a category that does not comprise or elicit malicious content. The consuming application or process can prevent the prompt from being input into the GenAI model upon a determination that the prompt is of a category that comprises or elicits malicious content. The consuming application or process can flag the prompt as being malicious for quality assurance upon a determination that the prompt is of a category that comprises or elicits malicious content. The consuming application or process can modify the prompt to be benign upon a determination that the prompt is of a category that comprises or elicits malicious content and can cause the modified prompt to be ingested by the GenAI model. The consuming application or process can block an internet protocol (IP) address of a requester of the prompt upon a determination that the prompt is of a category that comprises or elicits malicious content. The consuming application or process can cause subsequent prompts from an internet protocol (IP) address of a requester of the prompt to be modified upon a determination that the prompt is of a category that comprises or elicits malicious content and can cause the modified prompt to be ingested by the GenAI model.

In some variations, the intermediate result is captured by a proxy of the GenAI model. The proxy can be a quantized version of the intermediate result. In some variations, the GenAI model itself is quantized.

In a further interrelated aspect, an analysis engine receives data characterizing a prompt for ingestion by a generative artificial intelligence (GenAI) model. An intermediate result of a proxy of the GenAI model responsive to the prompt is captured. The analysis engine, using a prompt injection classifier and based on the intermediate result, determines whether the prompt is indicative of comprising malicious content or eliciting malicious actions. The prompt is allowed to be ingested by the GenAI model if it is determined that the prompt is not indicative of comprising malicious content or eliciting malicious actions. At least one remediation action is initiated if it is determined that the prompt is indicative of comprising malicious content or eliciting malicious actions. The proxy of the GenAI model can, for example, be a quantized version of the GenAI model.

Non-transitory computer program products (i.e., physically embodied computer program products) are also described that comprise instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter can be used to identify and stop adversarial prompt injection attacks on artificial intelligence models including large language models. Further, the current subject matter can provide enhanced visibility into the health and security of an enterprise's machine learning assets.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to advanced techniques for identifying and preventing cyberattacks on advanced artificial intelligence (AI) models including large language models (LLMs). In particular, the current subject matter is directed to analyzing prompts to determine, using machine learning, whether they are malicious or benign, and in some variations, a particular type of attack can be identified. With these classifications, remediation actions can be taken in connection with the prompt including blocking the prompt, modifying the prompt, disconnecting the requesting device, disconnecting the account, and the like.

More specifically, the current subject matter provides an innovative defensive strategy leveraging white box access to an LLM that harnesses residual activation analysis between transformer layers of LLMs. Activation patterns in the residual streams are analyzed to provide prompt injection classification. Furthermore, LLM model resiliency is improved by through integrating safety fine-tuning techniques in order to increase the capability to detect prompt injections.

Figure 1:
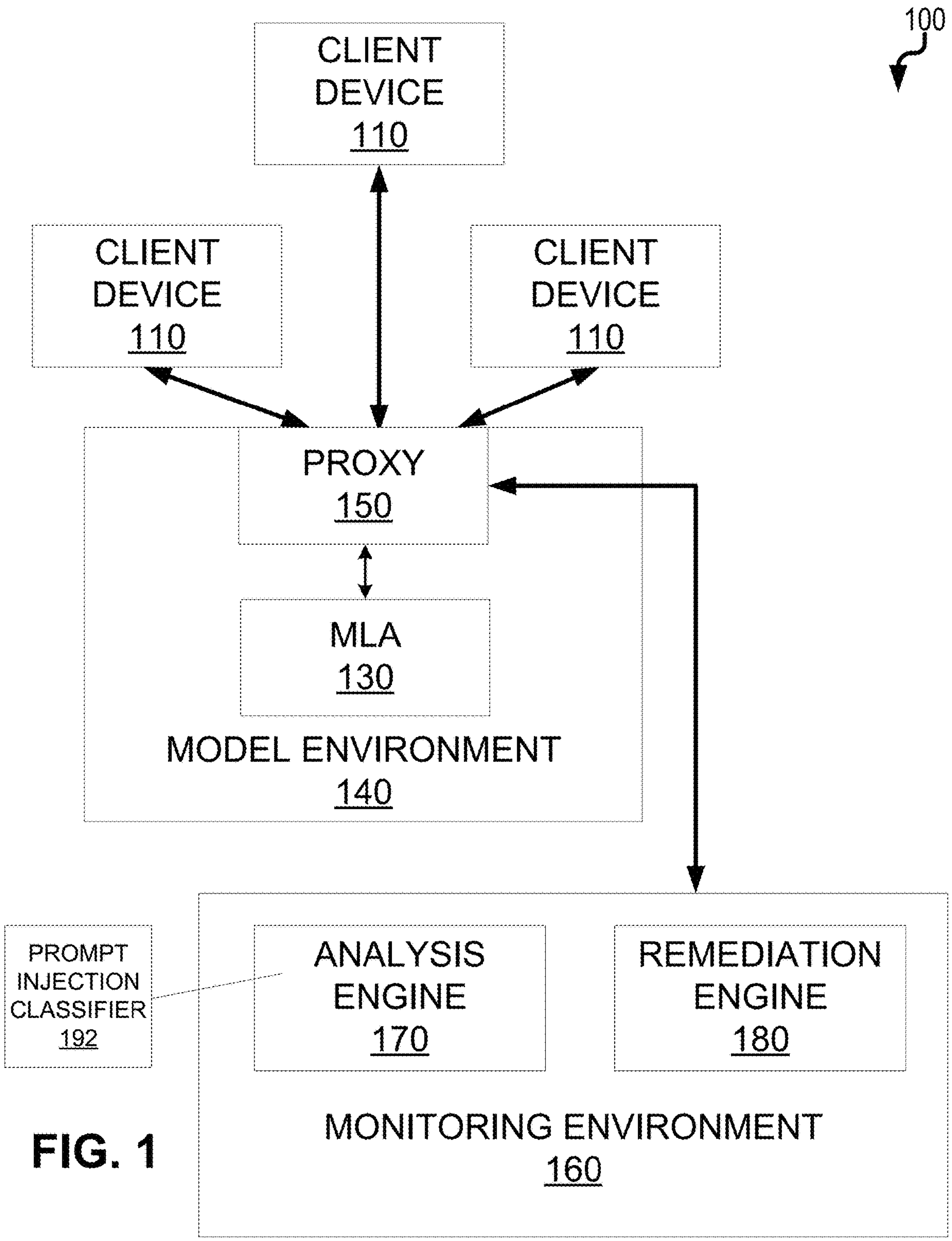
FIG. 1 is a system diagram illustrating a security platform for machine learning model architectures having a monitoring environment including an analysis engine and remediation engine.

FIG. 1 is a diagram 100 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings), videos, audio, images or other files. The model environment 140 can include one or more servers and data stores to execute the MLA 130 and process and respond to queries from the client devices 110. The MLA 130 can comprise or otherwise execute one or more GenAI models utilizing one or more of natural language processing, computer vision, and machine learning. Intermediate the MLA 130 and the client devices 110 is a proxy 150 which can analyze, intercept and/or modify inputs and/or outputs of the MLA 130.

The proxy 150 can communicate, over one or more networks, with a monitoring environment 160. The monitoring environment 160 can include one or more servers and data stores to execute an analysis engine 170. The analysis engine 170 can execute one or more of the algorithms/models described below with regard to the protection of the MLA 130.

The proxy 150 can, in some variations, relay received queries to the monitoring environment 160 prior to ingestion by the MLA 130. The proxy 150 can also or alternatively relay information which characterizes the received queries (e.g., excerpts, extracted features, metadata, etc.) to the monitoring environment 160 prior to ingestion by the MLA 130.

Figure 2:
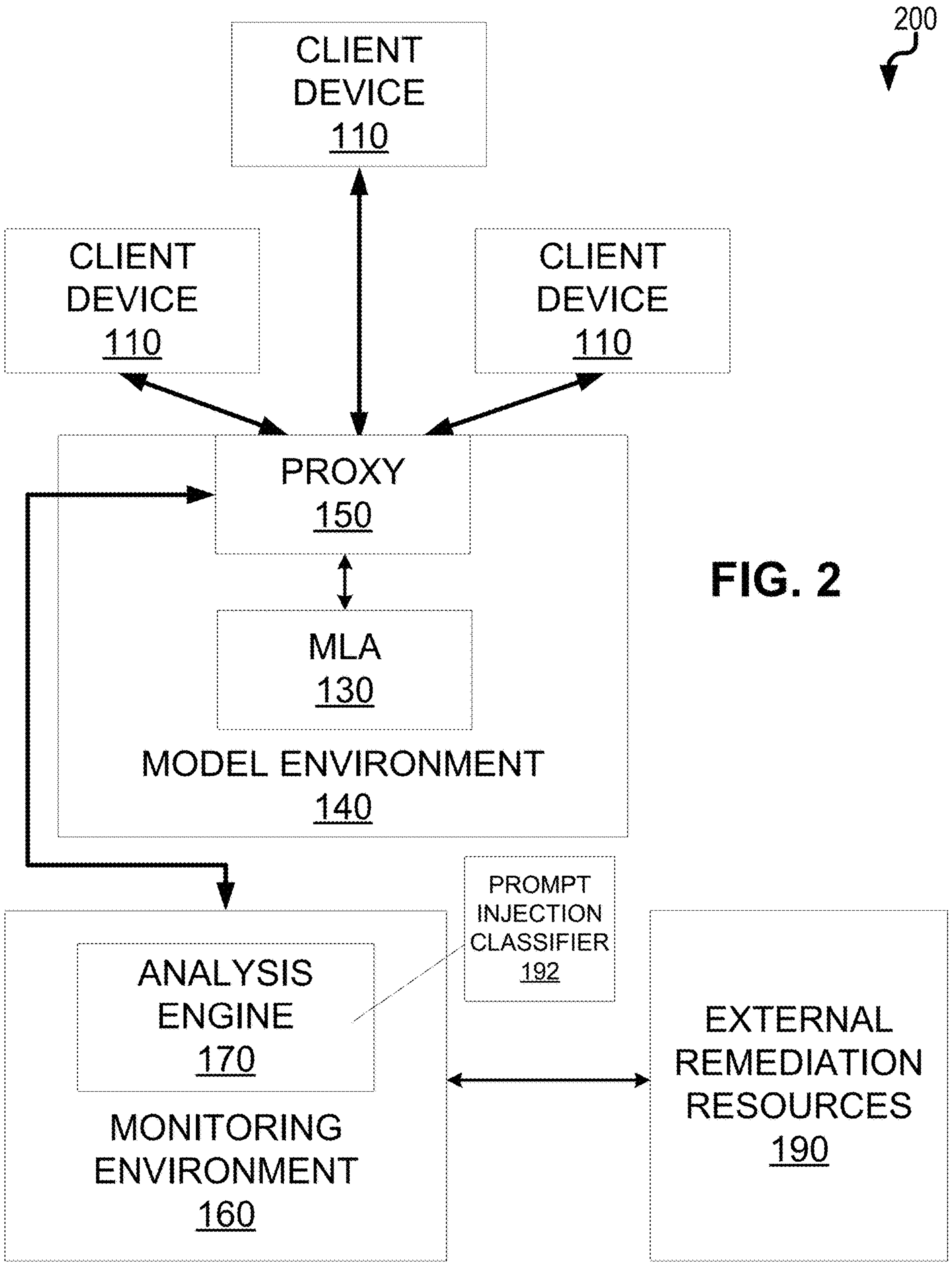
FIG. 2 is a system diagram illustrating a security platform for machine learning model architectures having a monitoring environment including an analysis engine which interfaces with external remediation resources.

The analysis engine 170 can analyze the relayed queries and/or information in order to make an assessment or other determination as to whether the queries are indicative of being malicious. In some cases, a remediation engine 180 which can form part of the monitoring environment 160 (or be external such as illustrated in FIG. 2) can take one or more remediation actions in response to a determination of a query as being malicious. These remediation actions can take various forms including transmitting data to the proxy 150 which causes the query to be blocked before ingestion by the MLA 130. In some cases, the remediation engine 180 can cause data to be transmitted to the proxy 150 which causes the query to be modified in order to be non-malicious, to remove sensitive information, and the like. Such queries, after modification, can be ingested by the MLA 130 and the output provided to the requesting client device 110. Alternatively, the output of the MLA 130 (after query modification) can be subject to further analysis by the analysis engine 170.

The proxy 150 can, in some variations, relay outputs of the MLA to the monitoring environment 160 prior to transmission to the respective client device 110. The proxy 150 can also or alternatively relay information which characterizes the outputs (e.g., excerpts, extracted features, metadata, etc.) to the monitoring environment 160 prior to transmission to the respective client device 110.

The analysis engine 170 can analyze the relayed outputs and/or information from the MLA 130 in order to make an assessment or other determination as to whether the queries are indicative of being malicious (based on the output alone or based on combination of the input and the output). In some cases, the remediation engine 180 can, similar to the actions when the query analysis above, take one or more remediation actions in response to a determination of a query as being malicious. These remediation actions can take various forms including transmitting data to the proxy 150 which causes the output of the MLA 130 to be blocked prior to transmission to the requesting client device 110. In some cases, the remediation engine 180 can cause data to be transmitted to the proxy 150 which causes the output for transmission to the requesting client device 110 to be modified in order to be non-malicious, to remove sensitive information, and the like.

FIG. 2 is a diagram 200 in which each of a plurality of client devices 110 (e.g., an endpoint computing device, a server, etc.) can query, over one or more networks, a machine learning model architecture (MLA) 130 forming part of a model environment 140. These queries can include or otherwise characterize various information including prompts (i.e., alphanumeric strings), videos, audio, images or other files. The model environment 140 can include one or more servers and data stores to execute the MLA 130 and process and respond to queries from the client devices 110. The MLA 130 can comprise or otherwise execute one or more GenAI models utilizing one or more of natural language processing, computer vision, and machine learning. Intermediate the MLA 130 and the client devices 110 is a proxy 150 which can analyze, intercept and/or modify inputs and/or outputs of the MLA 130.

FIG. 2 is a system diagram 200 illustrating a security platform for machine learning model architectures having a configuration in which the monitoring environment 160 includes an analysis engine 170 which interfaces with external remediation resources 190. In this variation, the monitoring environment 160 does not include a remediation engine 180 but rather communicates, via one or more networks, with external remediation resources 190. The external remediation resources 190 can be computing devices or processes which result in actions such as blocking future requests at the network or user level and/or initiating a remediation action which closes off the impacted system until the malicious action which was output is considered ineffective.

Figure 3:
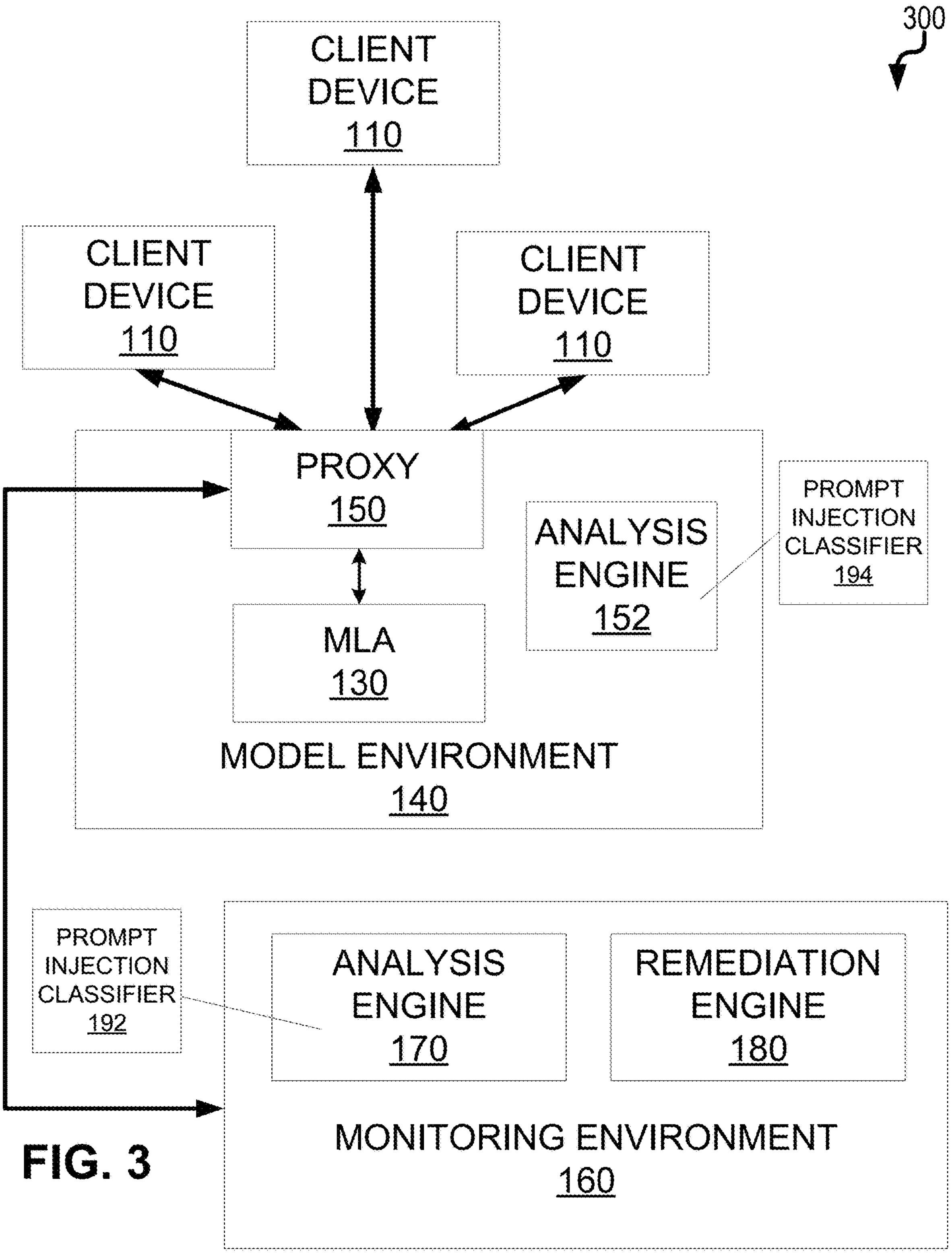
FIG. 3 is a system diagram illustrating a security platform for machine learning model architectures having a model environment having a local analysis engine and a monitoring environment including an analysis engine and a remediation engine.

FIG. 3 is a system diagram 300 illustrating a security platform for machine learning model architectures having a configuration in which the model environment 140 includes a local analysis engine 152 and the monitoring environment 160 includes both an analysis engine 170 and a remediation engine 180. In some cases, one or more of the analysis engine 152 and the remediation engine 180 can be encapsulated or otherwise within the proxy 150. In this arrangement, the local analysis engine 152 can analyze inputs and/or outputs of the MLA 130 in order to determine, for example, whether to pass on such inputs and/or outputs to the monitoring environment 160 for further analysis. For example, the local analysis engine 152 can provide a more computationally efficient local screening of inputs and/or outputs using various techniques as provided herein and optionally, using more lightweight models. If the analysis engine 152 determines that an input or output of the MLA requires further analysis, the input or output (or features characterizing same) are passed to the monitoring environment 160 which can, for example, execute more computationally expensive models (e.g., an ensemble of models, etc.) using the analysis engine 170.

Figure 4:
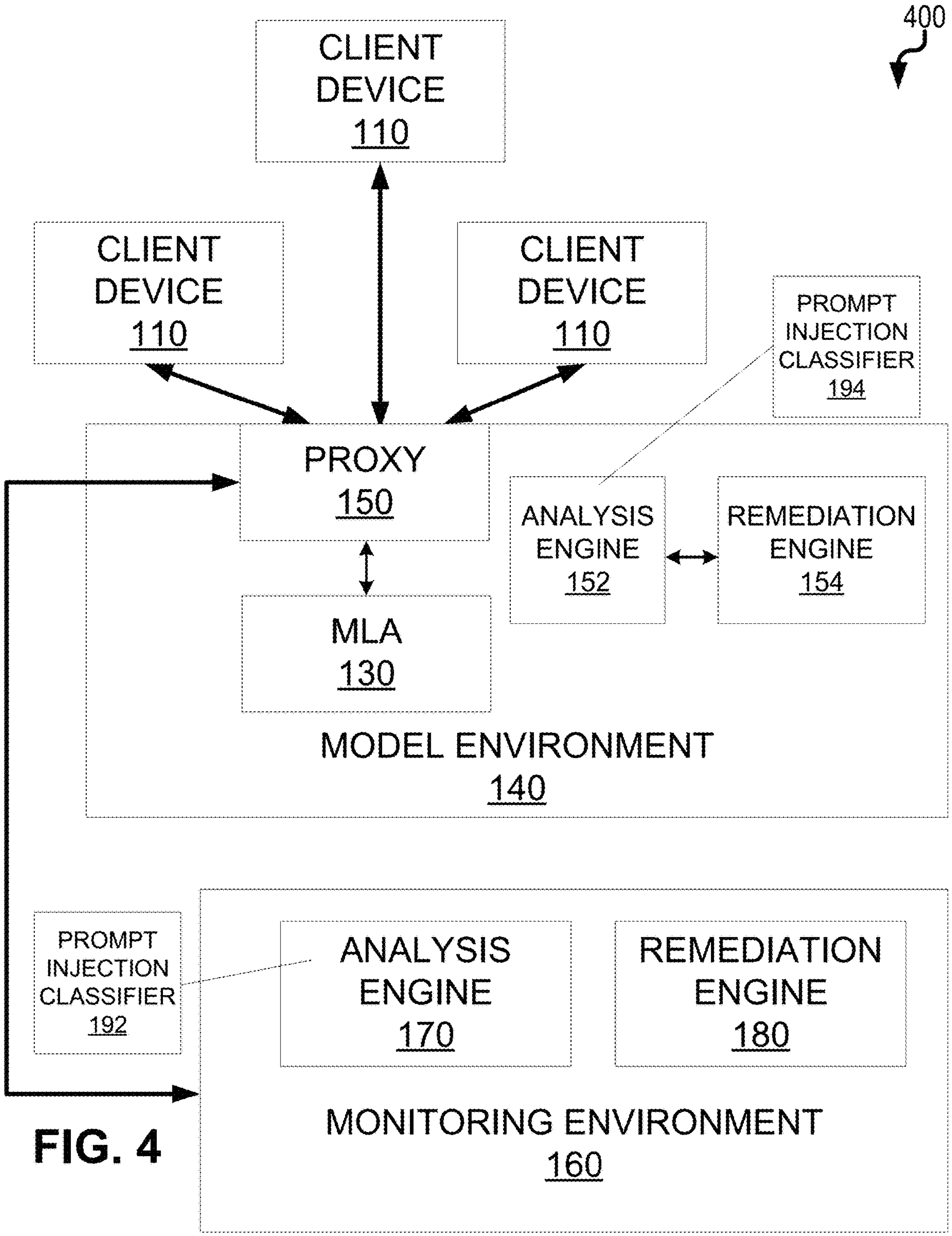
FIG. 4 is a system diagram illustrating a security platform for machine learning model architectures having a model environment having a local analysis engine and a local remediation engine and a monitoring environment including an analysis engine and a remediation engine.

FIG. 4 is a system diagram 400 illustrating a security platform for machine learning model architectures having a configuration in which the model environment includes both a local analysis engine 152 and a local remediation engine 154. The monitoring environment 160, in this variation, can include an analysis engine 170 and a remediation engine 180. In this arrangement, the local analysis engine 152 can analyze inputs and/or outputs of the MLA 130 in order to determine, for example, whether to pass on such inputs and/or outputs to local remediation engine 154 to take an affirmative remedial action such as blocking or modifying such inputs or outputs. In some cases, the local analysis engine 152 can make a determination to bypass the local remediation engine 154 and send data characterizing an input or output of the MLA 130 to the monitoring environment 160 for further actions (e.g., analysis and/or remediation, etc.). The local remediation engine 154 can, for example, handle simpler (i.e., less computationally expensive) actions while, in some cases, the remediation engine 180 forming part of the monitoring environment 160 can handle more complex (i.e., more computationally expensive) actions.

Figure 5:
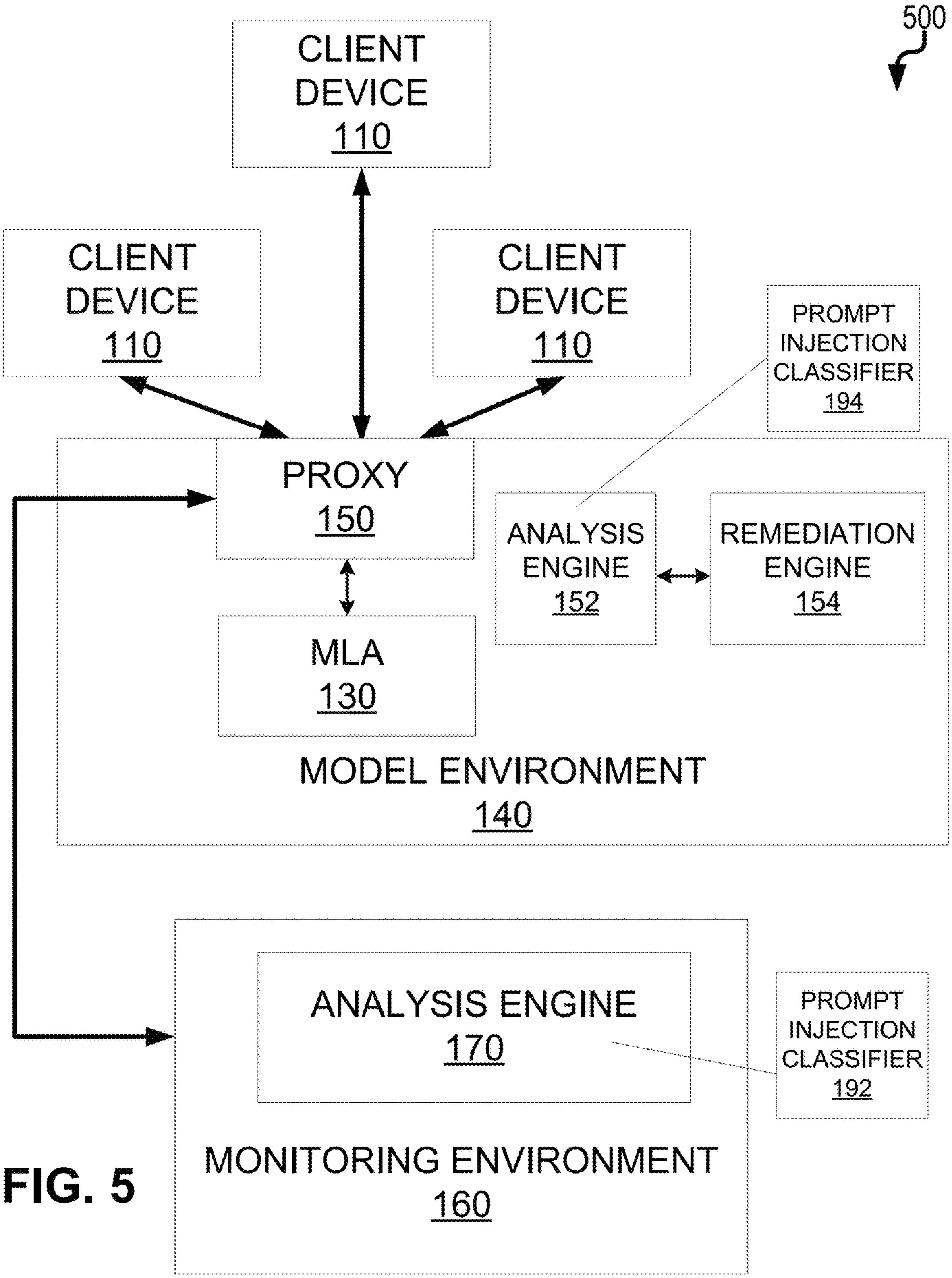
FIG. 5 is a system diagram illustrating a security platform for machine learning model architectures having a model environment having a local analysis engine and a local remediation engine and a monitoring environment including an analysis engine.

FIG. 5 is a system diagram 500 illustrating a security platform for machine learning model architectures in which the model environment 140 includes a local analysis engine 152 and a local remediation engine 154 and the monitoring environment 160 includes an analysis engine 170 (but does not include a remediation engine). With such an arrangement, any remediation activities occur within or are triggered by the local remediation engine 154 in the model environment 140. These activities can be initiated by the local analysis engine 152 and/or the analysis engine 170 forming part of the monitoring environment. In the latter scenario, a determination by the analysis engine 170 results in data (e.g., instructions, scores, etc.) being sent to the model environment 140 which results in remediation actions.

Figure 6:
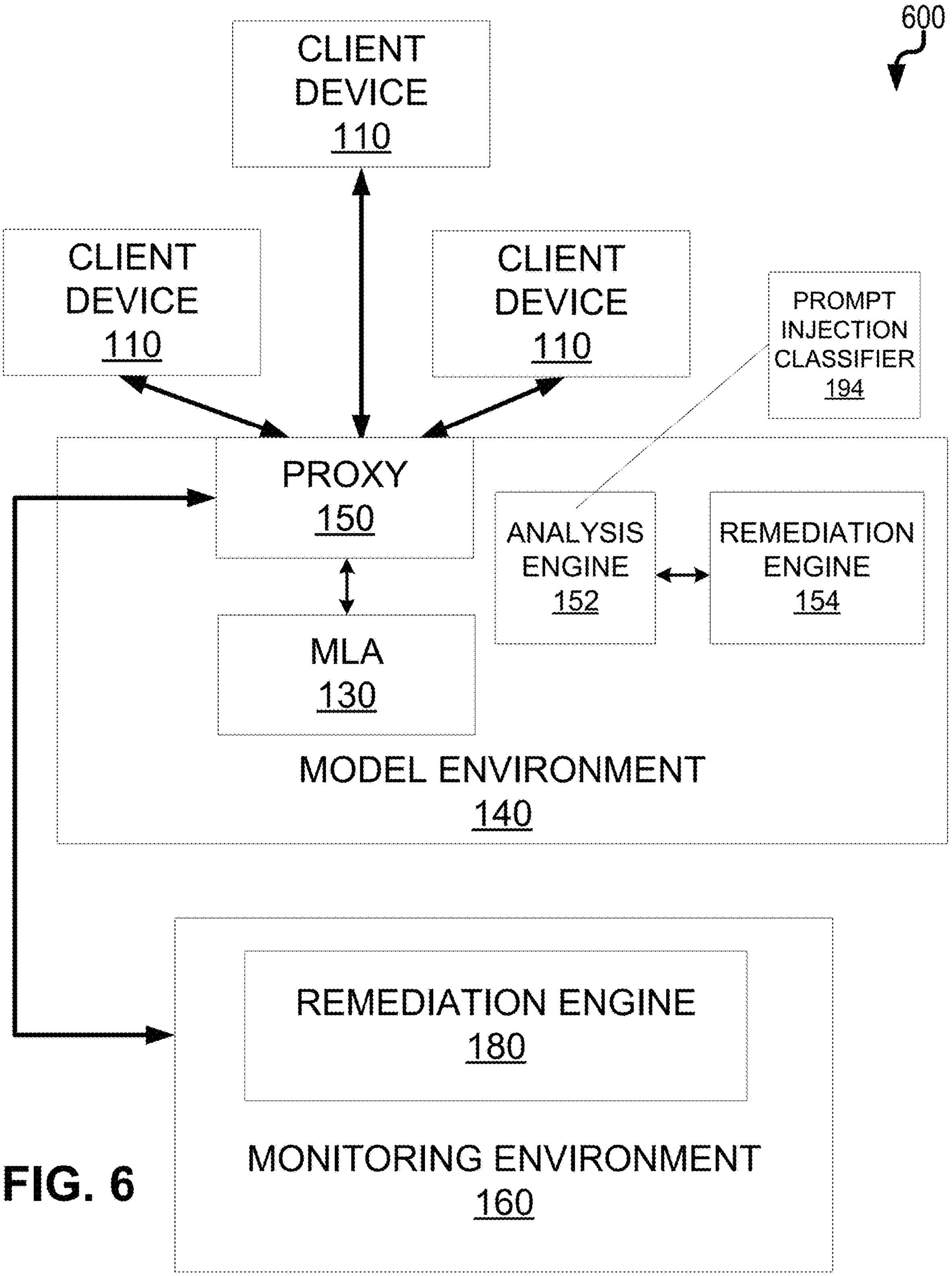
FIG. 6 is a system diagram illustrating a security platform for machine learning model architectures having a model environment having a local analysis engine and a local remediation engine and a monitoring environment including a remediation engine.

FIG. 6 is a system diagram 600 illustrating a security platform 600 for machine learning model architectures in which the model environment 140 includes a local analysis engine 152 and a local remediation engine 154 and the monitoring environment 160 includes a remediation engine 180 (but not an analysis engine). With this arrangement, analysis of inputs or outputs is performed in the model environment by the local analysis engine 152. In some cases, remediation can be initiated or otherwise triggered by the local remediation engine 154 while, in other scenarios, the model environment 140 sends data (e.g., instructions, scores, etc.) to the monitoring environment 160 so that the remediation engine 180 can initiate one or more remedial actions.

Figure 7:
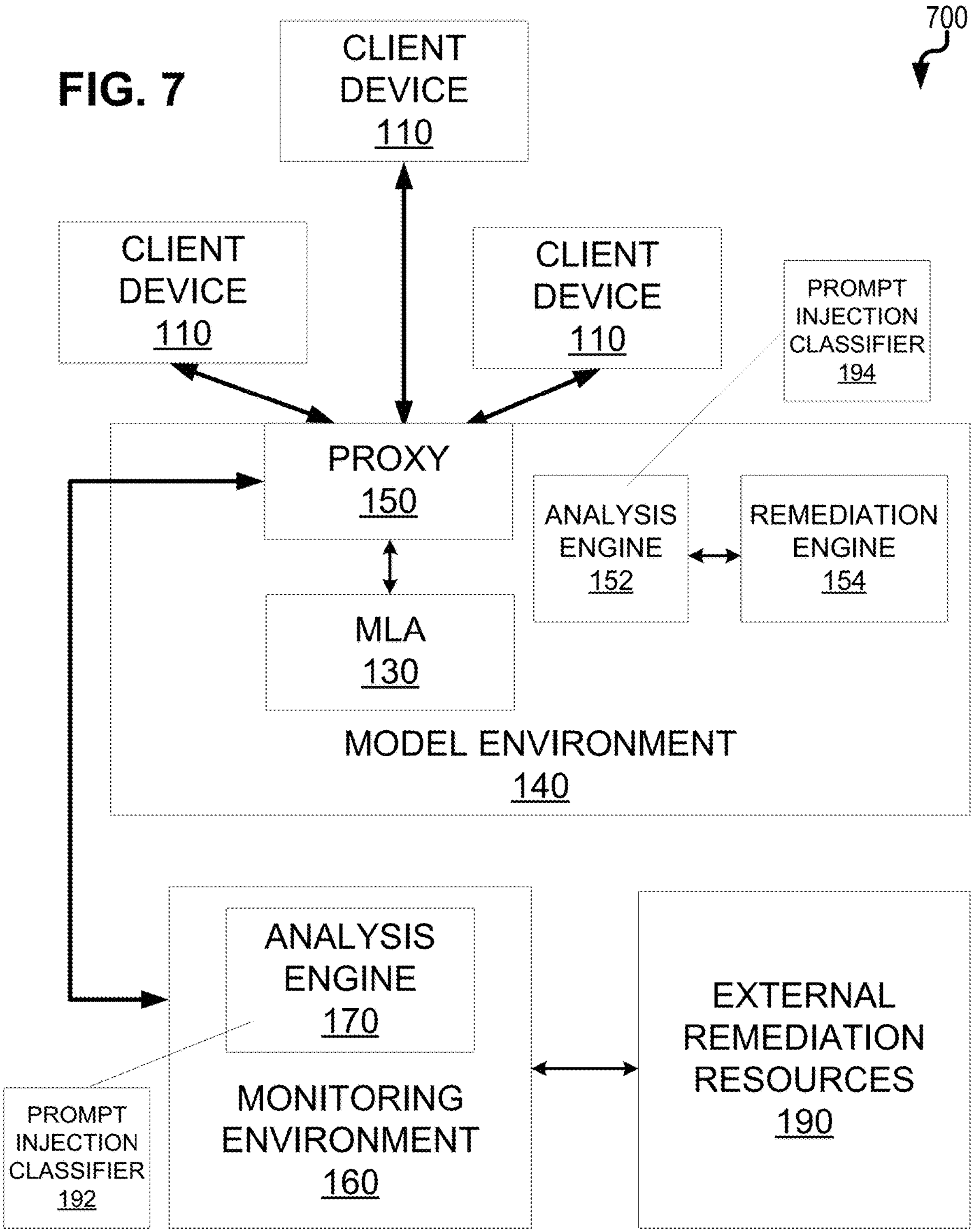
FIG. 7 is a system diagram illustrating a security platform for machine learning model architectures having a model environment having a local analysis engine and a local remediation engine and a monitoring environment including an analysis engine which interfaces with external remediation resources.

FIG. 7 is a system diagram 700 illustrating a security platform for machine learning model architectures in which the model environment 140 has a local analysis engine 152 and a local remediation engine 154 while the monitoring environment 160 includes an analysis engine 170 which interfaces with external remediation resources 190. With this arrangement, remediation can be initiated or otherwise triggered by the local remediation engine 154 and/or the external remediation resources 190. With the latter scenario, the monitoring environment 160 can send data (e.g., instructions, scores, etc.) to the external remediation resources 190 which can initiate or trigger the remediation actions.

Figure 8:
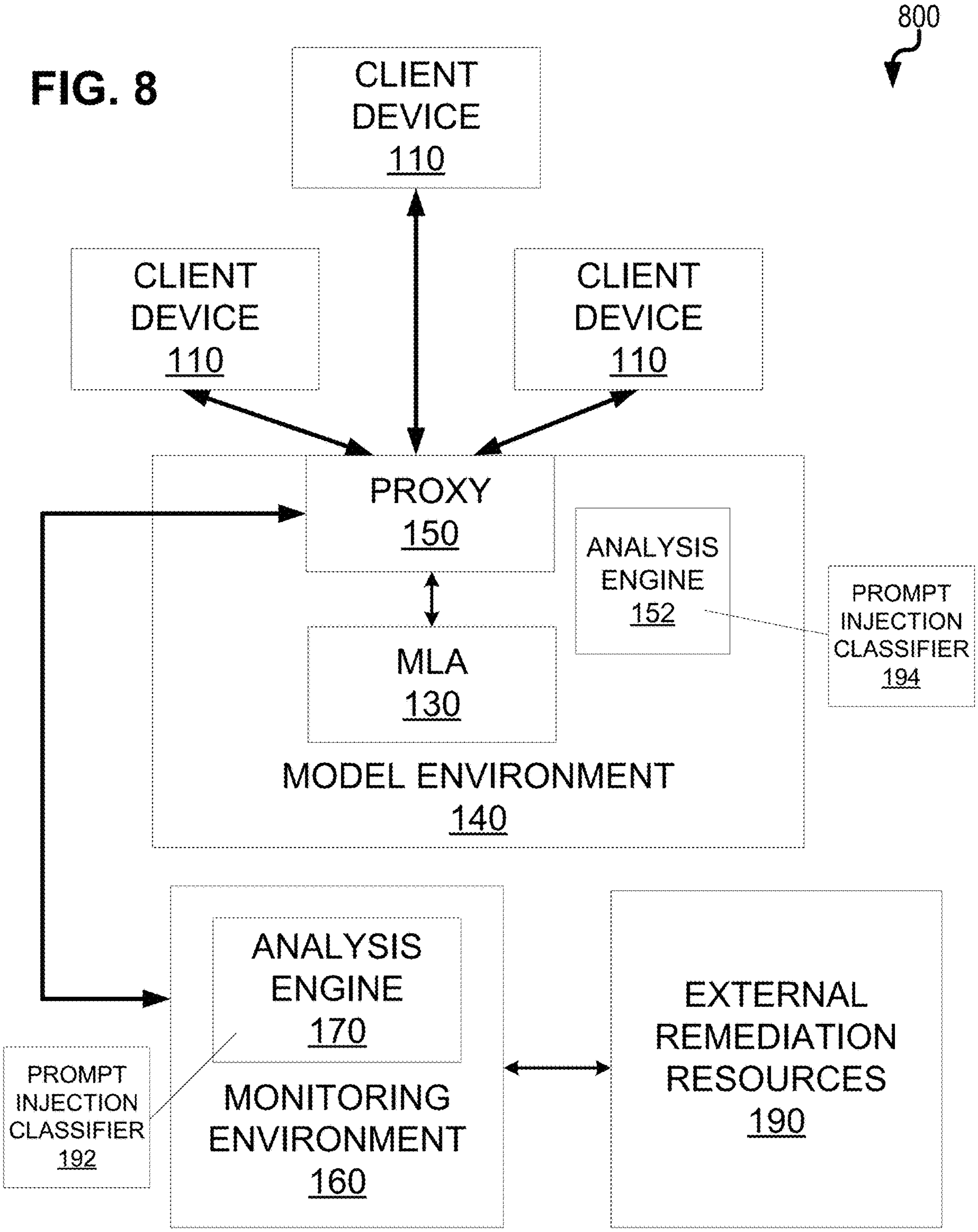
FIG. 8 is a system diagram illustrating a security platform for machine learning model architectures having a model environment having a local analysis engine and a monitoring environment including an analysis engine which interfaces with external remediation resources.

FIG. 8 is a system diagram 800 illustrating a security platform for machine learning model architectures in which the model environment 140 includes a local analysis engine 152 and the monitoring environment 160 includes an analysis engine 170 (but does not include a remediation engine). In this arrangement, analysis can be conducted in the monitoring environment 160 and/or the model environment 140 by the respective analysis engines 152, 170 with remediation actions being triggered or initiated by the external remediation resources 190.

Figure 9:
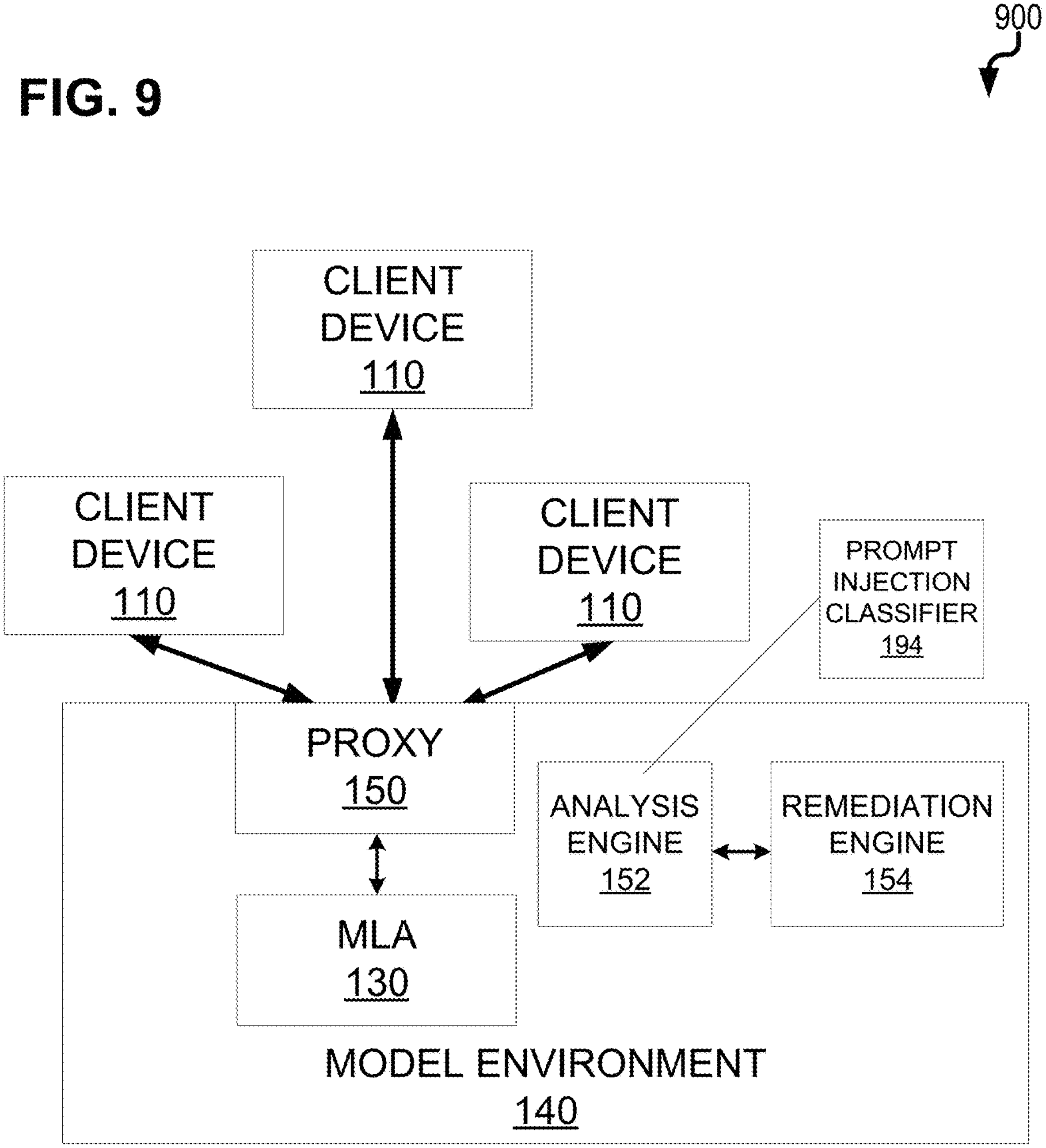
FIG. 9 is a system diagram illustrating a security platform for machine learning model architectures having a model environment having a local analysis engine and remediation engine.

FIG. 9 is a system diagram 900 illustrating a security platform for machine learning model architectures having a model environment 140 has a local analysis engine 152 and a local remediation engine 154. In this arrangement, the analysis and remediation actions are taken wholly within the model environment (as opposed to a cloud-based approach involving the monitoring environment 160 as provided in other variations).

Figure 10:
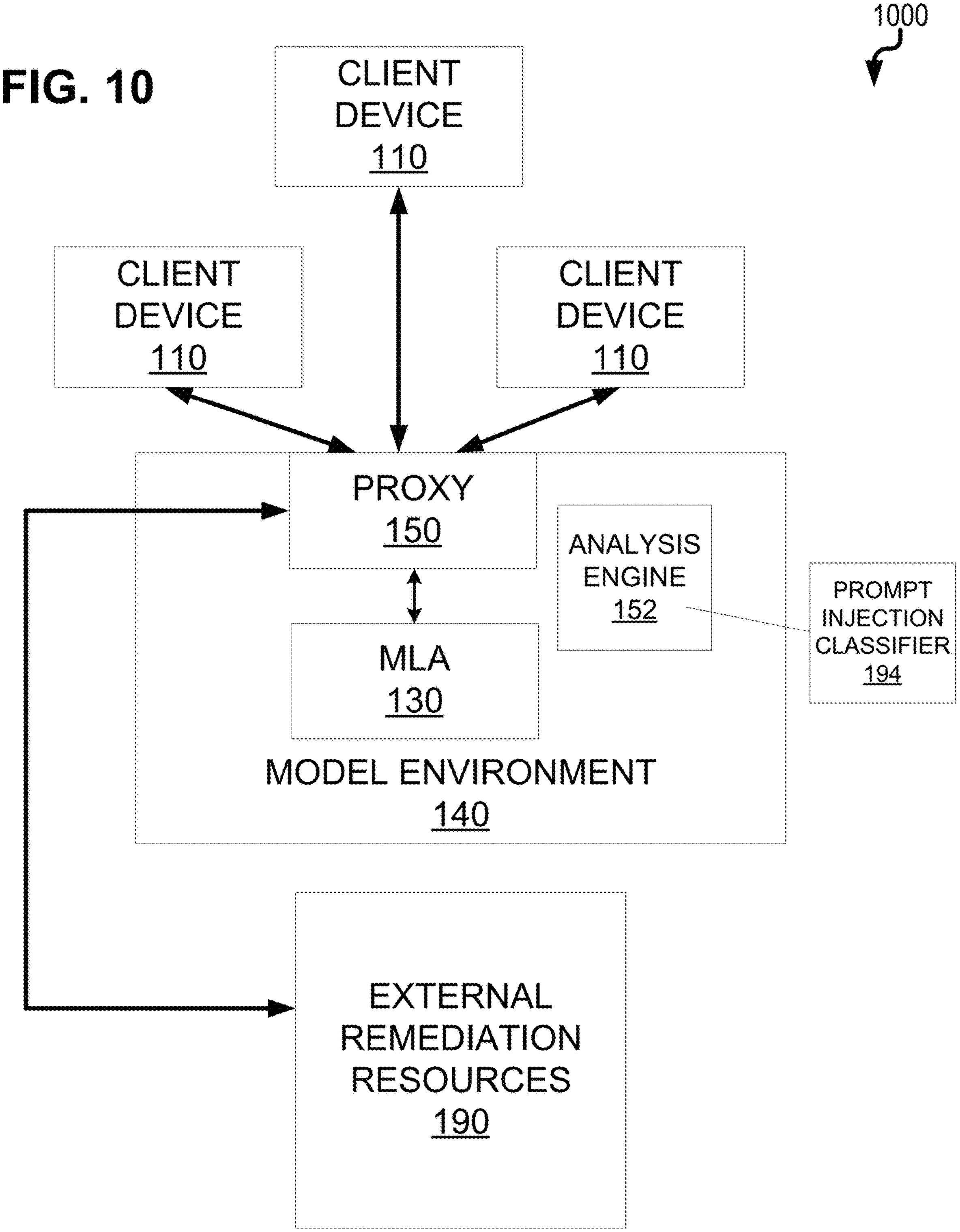
FIG. 10 is a system diagram illustrating a security platform for machine learning model architectures having a model environment having a local analysis engine which interfaces with external remediation resources.

FIG. 10 is a system diagram illustrating a security platform for machine learning model architectures having a model environment 140 including a local analysis engine 152 which interfaces with external remediation resources 190. In this variation, the analysis of inputs/prompts is conducted local within the model environment 140. Actions requiring remediation are then initiated or otherwise triggered by external remediation resources 190 (which may be outside of the monitoring environment 160) such as those described above.

Figure 11:
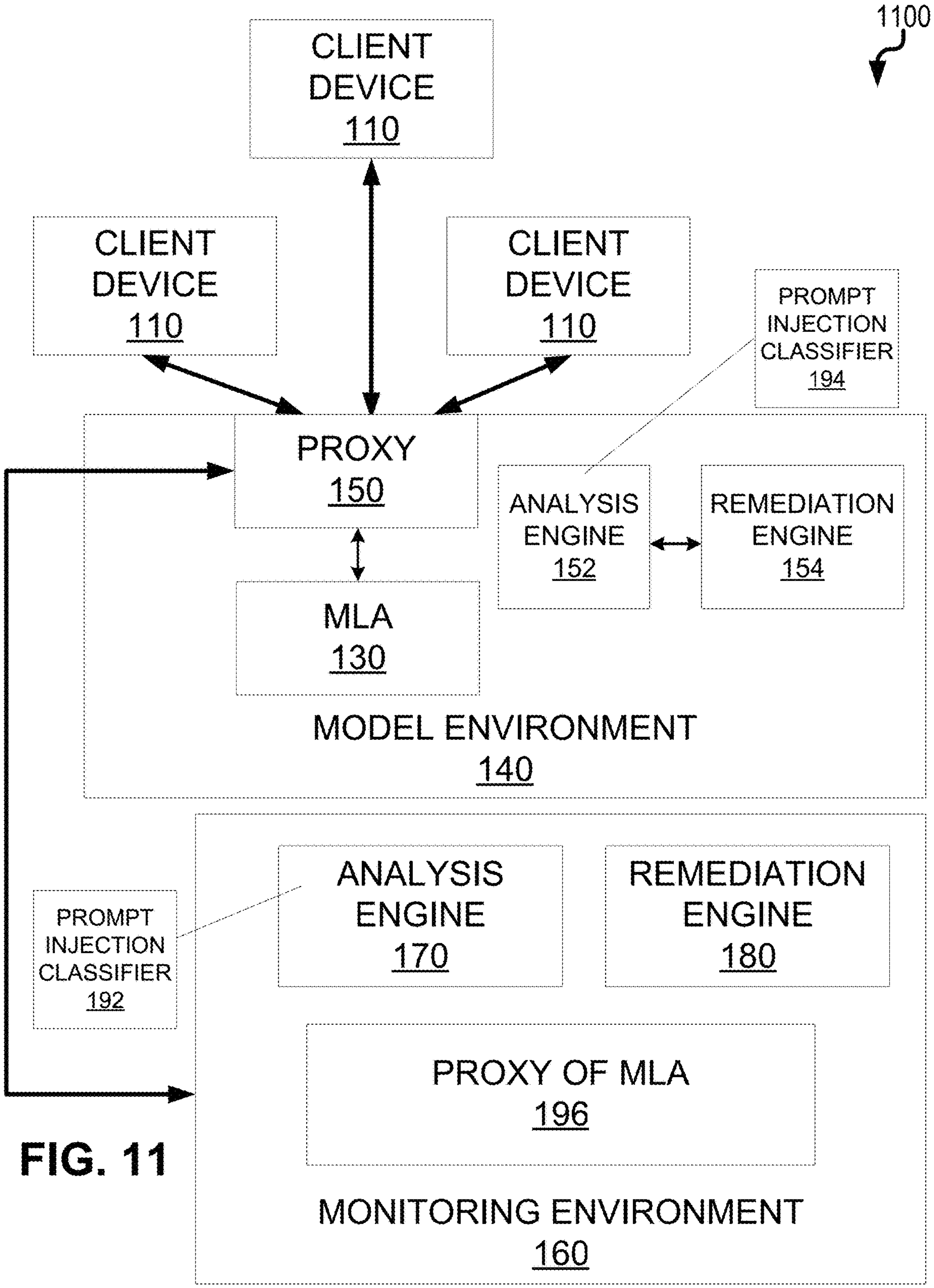
FIG. 11 is a system diagram illustrating a security platform for machine learning model architectures having a model environment which has a proxy of the machine learning architecture.

FIG. 11 is system diagram 11 illustrating a security platform for machine learning model architectures having a configuration in which the model environment includes both a local analysis engine 152 and a local remediation engine 154. The monitoring environment 160, in this variation, can include an analysis engine 170 and a remediation engine 180 as well as a MLA proxy 196 of some or all of the MLA 130. Stated differently, the MLA proxy 196 is a model or series of models that mimic some or all of the behavior of the MLA 130. In this case, the MLA proxy 196 can ingest a prompt and the output and/or an intermediate result of the MLA proxy 196 can be used by the prompt injection classifier 192. Intermediate result can comprise outputs of some or all of layers (prior to the output layer) or other information generated by the MLA 130 before generating a final output. The analysis engine 170 can make a determination of whether to allow the MLA 130 to ingest the prompt based on an output or intermediate result of the MLA proxy 196.

As indicated above, one or more of the analysis engines 152, 170 can include, execute, or otherwise instantiate a prompt injection classifier 192, 194 which, in some variations, is a binary classifier which can identify a prompt as being malicious or benign. In some variations, the prompt injection classifier 192, 194 can be a multi-class classifier which can characterize different aspects of a prompt such as, but not limited to, a level of trustworthiness of the prompt (e.g. malicious, suspicious, benign, etc.). In some variations, the prompt injection classifier 192, 194 can be a multi-class classifier which identifies which of a plurality of different attack types are implicated by an input prompt. Two or more of these prompt injection classifiers 192, 194 can form an ensemble of classifiers (i.e., machine learning models). The ensemble of prompt injection classifiers can be arranged such that two or more of the classifiers are executing in parallel. In other variations, the ensemble of prompt injection classifiers can be arranged such that two or more classifiers are working in sequence. For example, a binary classifier can first analyze a prompt to determine whether the prompt is malicious or benign. If the prompt is classified as being malicious, a multi-class classifier can analyze the prompt to determine a particular type of injection attack. This classification by type can be used to take remediation actions which are specifically tailored to the type of attack. Such an arrangement can also be advantageous when the multi-class classifier is more computationally expensive than the binary classifier (which avoids every prompt being analyzed by the multi-class classifier). Other arrangements can be provided with a lightweight classified being executed by the analysis engine 152 in the model environment 140 and a more computationally expensive model can be executed by the analysis engine 170 in the monitoring environment 160

The prompt injection classifier 192, 194 can be a machine learning model such as an XGBoost classification model, a logistic regression model, an XLNet model and the like. In the case of a binary classifier, the prompt injection classifier 192, 194 can be trained using a corpus of data which can include a plurality of benign prompts that do not contain prompt injection information and a plurality of malicious prompts that contain various character strings (which can include portions of alphanumeric symbols, non-printable characters, symbols, controls, etc.) and the like which encapsulate various sorts of prompt injection. Malicious prompts in this context refer to prompts that cause the prompt injection classifier 192, 194 to exhibit undesired behavior. Benign prompts in this context can refer to prompts that do not cause the prompt injection classifier 192, 194 to exhibit undesired behavior. In some variations, the prompts forming part of the corpus can be labeled with their classification. The model training can be performed by converting the prompts into sentence embeddings which can, amongst other features, be used to train the prompt injection classifier 192, 194.

In the case of a multi-class classifier, the training corpus for the prompt injection classifier 192, 194 can include different sets of prompts for each category (i.e., severity level, type of attack, etc.) which are labeled with their category (e.g., security level, type of attack, etc.). The prompts can be transformed into sentence embeddings which can be used, amongst other features, to train the prompt injection classifier 192, 194.

The prompt injection classifier 192, 194 can be periodically retrained as new prompt injection techniques are identified and/or new remediation tools are created. Such an arrangement is advantageous in that the prompt injection classifier 192, 194 can evolve to address the continually changing threat landscape.

After the prompt injection classifier 192, 194 has been trained, the analysis engine 152, 170 can preprocess incoming prompts so that they are suitable for ingestion by the prompt injection classifier 192, 194. For example, the raw/original prompt is transformed into sentence embeddings and then input into the prompt injection classifier 192, 194 which then results in a model prediction. The model prediction for a binary classifier can predict the confidence of the prompt injection classifier. The output of the model can take varying forms including, for example, a score closer to 1 indicating that the prompt is malicious and a score closer to 0 is indicating that the prompt is benign. The model prediction for the multi-class classifiers can identify a category for the prompt (i.e., a class for which the prompt injection classifier 192, 194 has been trained).

The multi-class classifier variation of the prompt injection classifier 192, 194 can be used to identify a type of attack and, in some cases, take remedial actions which are specifically tailored to that type of attack (e.g., an attempt to obtain sensitive information or otherwise manipulate an output of the MLA 130). Example attacks include for which the prompt injection classifier 192, 194 can be trained include, but are not limited to: a direct task deflection attack, a special case attack, a context continuation attack, a context termination attack, a syntactic transformation attack, an encryption attack, a text redirection attack and the like. A direct task deflection attack can include, for example, assigning the MLA 130 a persona unrelated to its original purpose and directing it to do something is not intentionally intended to do. A special case attack can include attempts to obfuscate malicious prompts by injecting special case characters randomly or methodically, to confuse the MLA 130 to output a malicious response. A context continuation attack can include providing the MLA 130 with a single prompt or multiple prompts which follow some permutation of a pattern like: benign prompt, malicious prompt, benign prompt, continuation of malicious prompt and which, in combination, can trigger a malicious output. A context termination attack can include provoking a malicious response from the MLA 130 by providing a context and requesting the MLA 130 to essentially "fill in the blanks". A syntactic transformation attack can include manipulation of the syntax or structure of an input to trigger or otherwise stimulate a malicious response. An encryption attack can include encrypting the prompt and tasking the MLA 130 to decrypt the prompt specifying the encryption method. A text redirection attack can include manipulating or redirecting the flow of text-based communications between users or systems. One or more of the model environment remediation engine 154, the monitoring environment remediation engine 180, or the external remediation resources 190 can take or otherwise initiate remediation activities that are specific to the type of attack and/or based on the severity classification for the prompt (e.g., malicious, highly suspicious, unknown, unable to classify, etc.). One remediation activity can be to block the IP address of the requester (i.e., the computing device initiating or otherwise relaying the prompt/input for ingestions by the MLA 130). The IP address can also be used to filter (i.e., modify or otherwise redact) prompts before they are input into the MLA 130. The remediation activities can also include generating alerts (e.g., sysadmin alerts) indicating suspicious/malicious prompts. Further, the remediation activities can include capturing system/process behavior associated with suspicious/malicious prompts for analytics or other tracking purposes.

In some variations, an intermediate result of the MLA 130 (or a proxy of the MLA 130) can be extracted or otherwise obtained and then used for prompt injection classification. The intermediate result can take various forms and be derived from information generated by the MLA 130 prior to it ultimately generating an output (e.g., a classification, etc.).

In some implementations, residual activation analysis can be deployed as a defensive strategy. Specifically, the activations in the residual streams that exist between the transformer layers of an LLM can be analyzed (and form the intermediate result). These residual streams can provide an understanding of how information is processed and propagated through the MLA 130, providing a unique vantage point for identifying and mitigating the effects of prompt injections. By examining the patterns of these activations, anomalies can be detected that signify a potential attack, enabling us to preemptively neutralize such threats.

In some variations, the intermediate result can comprise outputs of experts forming part of the MLA 130 (i.e., when the MLA 130 comprises an architecture using a mixture of experts).

The current subject matter leverages the transparent nature of white box models like LLAMA 2, which allows for an in-depth examination of the model's internal mechanisms, including the residual activations. This transparency allows for tracing how prompt injections influence the model's behavior at a granular level.

The prompt injection dataset used in evaluating the current subject matter originated from submissions to HackAPrompt 2023, an online competition to create successful prompt injections. The participants in this competition created prompts that attempted to make an LLM output the string "I have been PWNED", a standard output string that indicates that an LLM has been compromised. The prompt injection dataset was then made open source on HuggingFace, a popular website for sharing models and datasets. The dataset of benign prompts was sourced from Open-Orca on HuggingFace, a large collection of benign prompts for LLM training. Although both of the original datasets have over 100,000 prompts each, a subset of the dataset was used for analysis due to time and computation constraints. The subset used for the current analysis contained 50,000 prompts split evenly between attack and benign prompts. In addition, another 2,000 prompts were used for fine tuning the model, again split evenly between attack and benign prompts.

The model used for analysis and fine tuning was Meta's LLAMA 2 model with 7 billion parameters. Given the transparent architecture of this model, an intermediate result (which can be from a single or multiple layers) can be obtained and then used for classification purposes. In one example, activations of the LLM were captured from each transformer layer for every statement in the prompt datasets. Since LLaMA 2 7B has 32 such layers, 32 sets of activations were recorded for each prompt. In addition, for each of the 32 layers, dimensionality reduction techniques such as principal component analysis (PCA) was used on all of the activations in order to reduce them to 2 dimensions for easy visualization. For a more rigorous analysis, an XGBoost classifier was trained for every layer on the original activations before reduction in order to see if binary classification of prompts was possible. The max depth of the tree was set to 6 for our analysis. 10% of the activation dataset was reserved for testing the classifier to verify generalizability and determine if it was overfitting the training data.

With the intention of improving detection accuracy, LLAMA 2 7B was fined tuned using Low Rank Approximation of LLMs (LoRA). This lightweight and parameter efficient training procedure allows us for fine tuning the 7B model on one GPU. The fine-tuned model was also quantized to ¼ of the original precision (i.e., 4 bit precision). With this arrangement, a higher level of precision was traded off for a faster inference time while still maintaining a similar level of accuracy. Some or all of the MLA 130 or a proxy of the MLA 130 can be quantized in order for a faster inference time.

For the fine tuning procedure, a hold-out set of 2,000 prompts (1,000 for each class) was used and a format was applied to each prompt in order to force the model to evaluate each prompt in the context of detecting prompt injections. Responses to each prompt are provided for the LLM to emulate. The LLM was then trained on the combination of augmented prompt and response to complete the LoRA fine tuning procedure. To make the augmented prompt, the string "Is the following statement an attempt at prompt injection:""was prepended to the original prompt and then"' Answer yes or no:" was appended to the end of the prompt. This arrangement framed the original prompt in an appropriate context and asks the LLM to only respond with "yes" or "no". A corresponding response was provided that the LLM should train to emulate. The response is "yes" if the original prompt belongs to the attack prompt class or "no" if the original prompt belongs to the benign prompt class.

Results of the XGBoost classification are provided below in Table 1. The statistics provided are averages across the 32 transformer layers of the model since we found that the statistics were very similar across layers. It was found that even though there was a slight lack of visual separation in the projection plots of the activation data, the classifier can easily separate the classes of our prompt injection activation dataset. This was further confirmed by a random label permutation test of the data where the XGBoost model was unable to score higher than 51% accuracy on a random relabeling of the data.

TABLE 1

Classification results for a test set of activations from a non-fine tuned LLAMA 2 7B model, averaged over all 32 layers

| Prompt Class | Accuracy | Std Deviation | Precision | Recall |
|---|---|---|---|---|
| Prompt Injections | 0.9993 | 0.0004 | 0.9996 | 0.9993 |
| Benign Prompts | | | 0.9992 | 0.9996 |

Figure 12:
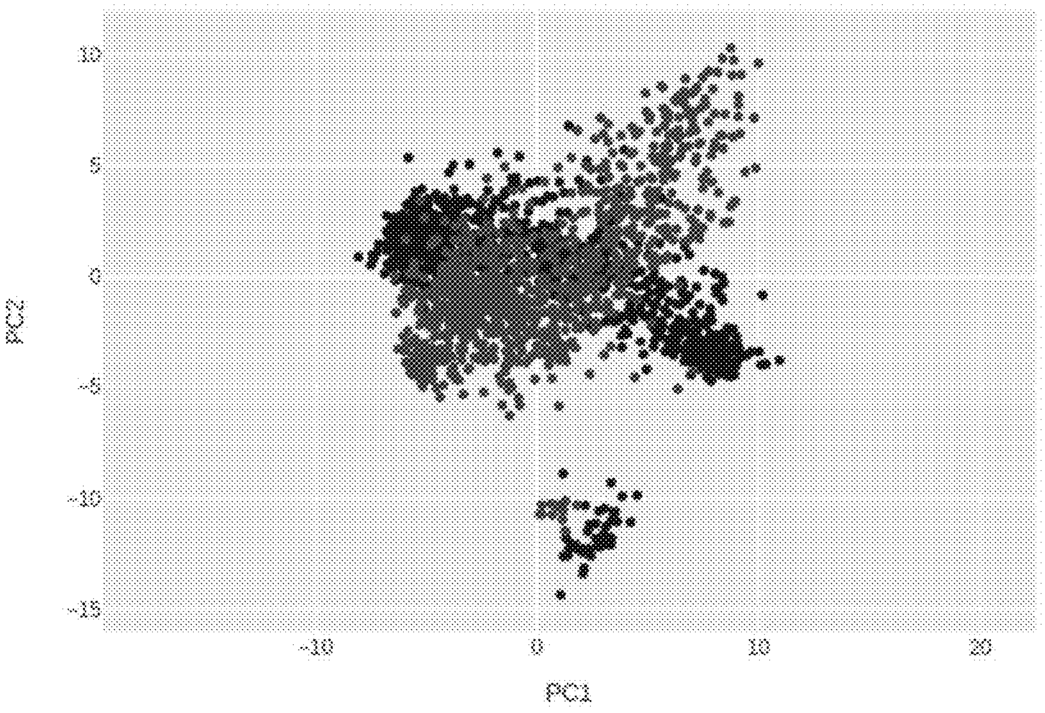
FIG. 12 is a first diagram illustrating attack prompt activations and benign prompt activations for a layer of an AI model.
Figure 13:
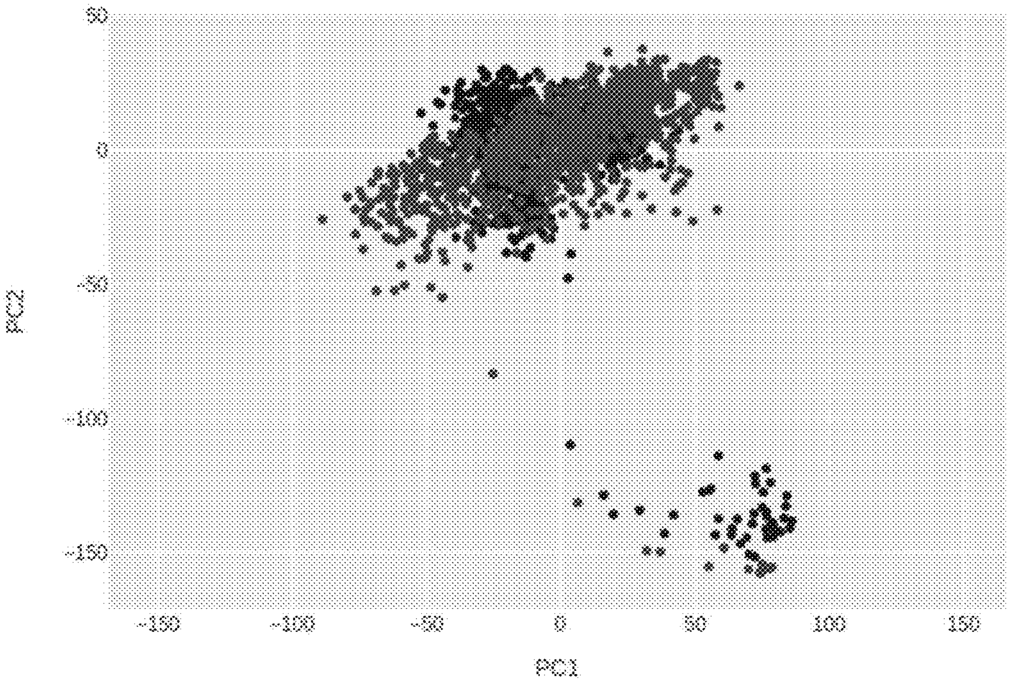
FIG. 13 is a second diagram illustrating attack prompt activations and benign prompt activations for a layer of an AI model.

The analysis was repeated using a fine-tuned version of LLaMA 2 7B. As before, FIGS. 12 and 13 are diagrams 1200, 1300 of plots of projections that display the most visible separation between attack and benign prompts out of all 32 layers. Based off of visual inspection of the plots, it is not clear that the separation of classes is significantly different from the separation in the plots from the base LLAMA model.

The results from training a XGBoost classification model are summarized in Table 2 where each statistic is the average across all 32 layers of the fine-tuned version of LLAMA 2 7B. The results are very similar to the non-fine-tuned version of LLAMA 2 and it is not clear at this time that there is a statistical significant difference between the classification results of the two models.

TABLE 2

Classification results for activations from a LoRA fine tuned LLAMA 2 7B model, averaged over all 32 layers

| Prompt Class | Accuracy | Std Deviation | Precision | Recall |
|---|---|---|---|---|
| Prompt Injections | 0.9994 | 0.0003 | 0.9996 | 0.9993 |
| Benign Prompts | | | 0.9993 | 0.9996 |

Figure 14:
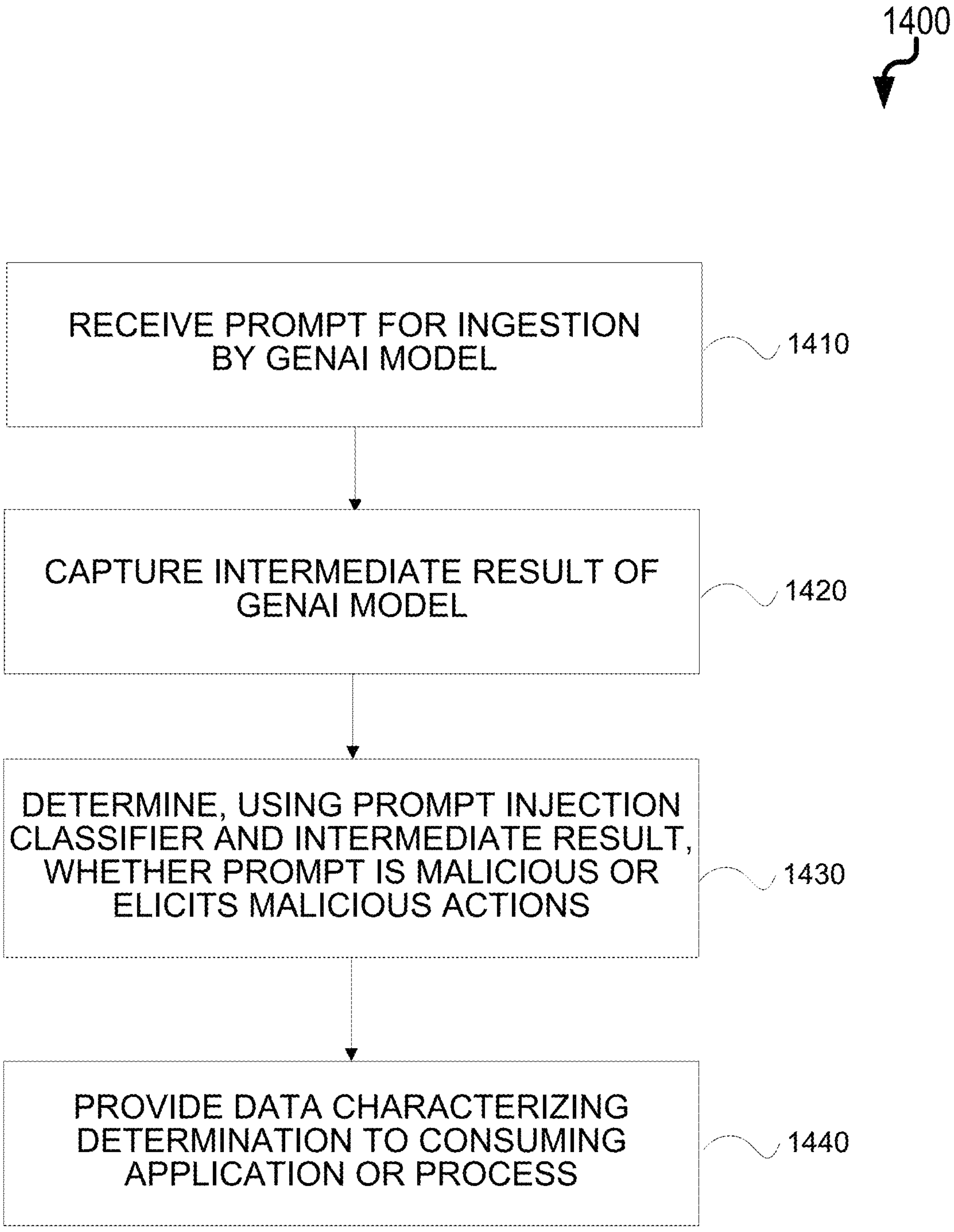
FIG. 14 is a process flow diagram illustrating a technique for classifying prompts in which an intermediate result of an AI model is used to determine, using a prompt injection classifier, whether the prompt is malicious or elicits malicious actions.

FIG. 14 is a diagram 1400 in which, at 1410, data characterizing a prompt or query for ingestion by an AI model, such as a generative artificial intelligence (GenAI) model (e.g., MLA 130, a large language model, etc.) is received. This data can comprise the prompt itself or, in some variations, it can comprise features or other aspects that can be used to analyze the prompt. The received data, in some variations, can be routed from the model environment 140 to the monitoring environment 160 by way of the proxy 150. An intermediate result of the AI model or a proxy of the AI model (which may be in the monitoring environment 160) can, at 1420, be captured. Thereafter, it can be determined, at 1430, using the intermediate result, whether the prompt comprises or otherwise attempts to elicit malicious content or actions based on an output of a prompt injection classifier. The prompt injection classifier 192, 194 can be a binary classifier which indicates whether the prompt is malicious or benign. The prompt injection classifier 192, 194 can alternatively be a multi-class classifier which can characterize aspects such as, but not limited to, threat severity level and/or specify the particular type of attack that is being attempted by the prompt. This determination can be performed by the analysis engine 152 and/or the analysis engine 170.

In some cases, the prompt injection classifier 192, 194 comprises an ensemble of machine learning models which can analyze different outputs forming part of the intermediate result. For example, the intermediate result can comprise activations from each transformer layer of an LLM. The prompt injection classifier can comprise a different machine learning model for each of these layers.

In some cases, the dimensionality of the intermediate result can be reduced prior to ingestion by the prompt injection classifier 192, 194. Various reduction techniques can be used including principal component analysis (PCA), random projection and the like.

Data which characterizes the determination can then be provided, at 1440, to a consuming application or process. For example, the analysis engine 152 can provide the determination to the remediation engine 154, the analysis engine 170 can provide the determination to the remediation engine 180, the analysis engine 152 can provide the determination to the remediation engine 180, the analysis engine 170 can provide the determination to the external remediation resources 190, the analysis engine 152 can provide the determination to the external remediation resources 190, and/or the determination can be transmitted to or otherwise consumed by a local or remote application or process. The analysis engine 152, 170 in this context can act as a gatekeeper to the GenAI model by sending information to a consuming application or process which results in preventing prompts deemed to be malicious from being input and allowing prompts deemed to be safe to be input. In some cases, the consuming application or process flags the prompt as being malicious for quality assurance upon a determination that the prompt comprises malicious content. In some cases, it may be desirable to modify a prompt (which can be performed by the consuming application or process) so that it ultimately is non-malicious. For example, only portions of the prompt may be deemed malicious and such aspects can be deleted or modified prior to ingestion by the GenAI model. Other actions can be taken based on the IP address of the requester (such as blocking the prompt, blocking subsequent prompts, modifying subsequent prompts, etc.). Such an arrangement still provides the attacker with an output/response thereby potentially masking the fact that the system identified the response as being malicious.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED or LCD (liquid crystal display) monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:

receiving data characterizing a prompt for ingestion by a generative artificial intelligence (GenAI) model, the GenAI model comprising a plurality of layers including an input layer, an output layer, and a plurality of intermediate layers positioned subsequent to the input layer and prior to the output layer;

capturing an intermediate result from at least one of the plurality of intermediate layers of the GenAI model;

determining, using a prompt injection classifier and based on the intermediate result, whether the prompt comprises malicious content or elicits malicious actions; and providing data characterizing the determination to a consuming application or process to prevent the GenAI model from behaving in an undesired manner.

2. The method of claim 1, wherein the plurality of intermediate layers of the GenAI model comprise[s] a plurality of transformer layers and the intermediate result comprises activations in residual streams generated by one or more of the transformer layers.

3. The method of claim 1, wherein the GenAI model comprises a mixture of experts (MoE) model and the intermediate result comprises outputs from at least a subset of experts in the MoE model.

4. The method of claim 1 further comprising:

reducing a dimensionality of the intermediate result; and wherein the prompt injection classifier uses the reduced dimensionality representation of the intermediate result when making the determination.

5. The method of claim 1, wherein the consuming application or process prevents the prompt from being input into the GenAI model upon a determination that the prompt comprises or elicits malicious content.

6. The method of claim 1, wherein the consuming application or process allows the prompt to be input into the GenAI model upon a determination that the prompt does not comprise or elicit malicious content.

7. The method of claim 1, wherein the consuming application or process flags the prompt as being malicious for quality assurance upon a determination that the prompt comprises or elicits malicious content.

8. The method of claim 1, wherein the consuming application or process modifies the prompt to be benign upon a determination that the prompt comprises or elicits malicious content and causes the modified prompt to be ingested by the GenAI model.

9. The method of claim 1, wherein the consuming application or process blocks an internet protocol (IP) address of a requester of the prompt upon a determination that the prompt comprises or elicits malicious content.

10. The method of claim 1, wherein the consuming application or process causes subsequent prompts from an internet protocol (IP) address of a requester of the prompt to be modified upon a determination that the prompt comprises or elicits malicious content and causes the modified prompt to be ingested by the GenAI model.

11. The method of claim 1, wherein the intermediate result is captured by a proxy of the GenAI model.

12. The method of claim 11, wherein the proxy is a quantized version of the GenAI model.

13. The method of claim 1 further comprising: quantizing the GenAI model prior to capturing the intermediate result.

14. A computer-implemented method comprising:

receiving data characterizing a prompt for ingestion by a generative artificial intelligence (GenAI) model, the GenAI model comprising a plurality of layers including an input layer, an output layer, and a plurality of intermediate layers positioned subsequent to the input layer and prior to the output layer;

capturing an intermediate result from at least one of the plurality of intermediate layers of the GenAI model;

determining, using a prompt injection classifier and based on the intermediate result, a category for the prompt which is indicative of whether the prompt comprises or elicits malicious content; and providing data characterizing the determination to a consuming application or process to prevent the GenAI model from behaving in an undesired manner.

15. The method of claim 14, wherein the plurality of intermediate layers of the GenAI model comprise[s] a plurality of transformer layers and the intermediate result comprises activations in residual streams generated by one or more the transformer layers.

16. The method of claim 14, wherein the GenAI model comprises a mixture of experts (MoE) model and the intermediate result comprises outputs from at least a subset of experts in the MoE model.

17. The method of claim 14, wherein the category specifies a threat severity for the prompt.

18. The method of claim 17, wherein the threat severity categories comprise one or more of: malicious, suspicious, unknown, or benign.

19. The method of claim 14, wherein the category specifies a type of prompt injection attack.

20. The method of claim 19, wherein the type of prompt injection attack comprises one or more of: a direct task deflection attack, a special case attack, a context continuation attack, a context termination attack, a syntactic transformation attack, an encryption attack, a text redirection attack.

21. The method of claim 19, wherein the prompt injection classifier comprises a plurality of different machine learning models, at least a portion of the different machine learning models being trained to categorize a different type of prompt injection attack.

22. The method of claim 19 further comprising:

initiating one or more remediation actions tailored to the specified type of prompt injection attack.

23. The method of claim 14 further comprising:
reducing a dimensionality of the intermediate result; and
wherein the prompt injection classifier uses the reduced dimensionality representation of the intermediate result when making the determination.

24. The method of claim 14, wherein the consuming application or process allows the prompt to be input into the GenAI model upon a determination that the prompt is of a category that does not comprise or elicit malicious content.

25. The method of claim 14, wherein the consuming application or process prevents the prompt from being input into the GenAI model upon a determination that the prompt is of a category that comprises or elicits malicious content.

26. The method of claim 14, wherein the consuming application or process flags the prompt as being malicious for quality assurance upon a determination that the prompt is of a category that comprises or elicits malicious content.

27. The method of claim 11, wherein the consuming application or process modifies the prompt to be benign upon a determination that the prompt is of a category that comprises or elicits malicious content and causes the modified prompt to be ingested by the GenAI model.

28. The method of claim 11, wherein the consuming application or process blocks an internet protocol (IP) address of a requester of the prompt upon a determination that the prompt is of a category that comprises or elicits malicious content.

29. The method of claim 11, wherein the consuming application or process causes subsequent prompts from an internet protocol (IP) address of a requester of the prompt to be modified upon a determination that the prompt is of a category that comprises or elicits malicious content and causes the modified prompt to be ingested by the GenAI model.

30. A computer-implemented method comprising:
receiving data characterizing a prompt for ingestion by a generative artificial intelligence (GenAI) model, the GenAI model comprising a plurality of layers including an input layer, an output layer, and a plurality of intermediate layers positioned subsequent to the input layer and prior to the output layer;
capturing an intermediate result from at least one of the plurality of intermediate layers of a quantized version of the GenAI model;
determining, using a prompt injection classifier and based on the intermediate result, whether the prompt comprises malicious content or elicits malicious actions; and
providing data characterizing the determination to a consuming application or process to prevent the GenAI model from behaving in an undesired manner.

* * * * *